(12) United States Patent
Hakemi et al.

(10) Patent No.: US 11,493,797 B2
(45) Date of Patent: Nov. 8, 2022

(54) DYNAMIC SIGNAGE, GLAZED AND PATTERNED PDLC DEVICES AND METHODS FOR CREATING THEREOF

(71) Applicant: GAUZY LTD., Tel-Aviv (IL)

(72) Inventors: Hassan-Ali Hakemi, Macherio (IT); Adrian Lofer, Kfar Saba (IL); Eyal Peso, Bat Yam (IL)

(73) Assignee: Gauzy Ltd., Tel-Aviv (IL)

( * ) Notice: Subject to any disclaimer, the term of this patent is extended or adjusted under 35 U.S.C. 154(b) by 0 days.

(21) Appl. No.: 15/520,449

(22) PCT Filed: Oct. 19, 2015

(86) PCT No.: PCT/IL2015/051031
§ 371 (c)(1),
(2) Date: Apr. 20, 2017

(87) PCT Pub. No.: WO2016/063277
PCT Pub. Date: Apr. 28, 2016

(65) Prior Publication Data
US 2017/0307916 A1    Oct. 26, 2017

Related U.S. Application Data

(60) Provisional application No. 62/065,811, filed on Oct. 20, 2014.

(51) Int. Cl.
*G02F 1/1334* (2006.01)
*G02F 1/1333* (2006.01)
*G02F 1/13* (2006.01)

(52) U.S. Cl.
CPC .......... *G02F 1/1334* (2013.01); *G02F 1/1303* (2013.01); *G02F 1/133305* (2013.01); *G02F 2203/01* (2013.01)

(58) Field of Classification Search
CPC .................. G02F 1/133305; G02F 1/1334
See application file for complete search history.

(56) References Cited

U.S. PATENT DOCUMENTS

| 4,423,191 A | 12/1983 | Haven et al. |
| 4,934,423 A | 6/1990 | Withrow et al. |

(Continued)

FOREIGN PATENT DOCUMENTS

| CN | 1103941444 A | 7/2014 |
| EP | 1372023 A2 | 12/2003 |

(Continued)

OTHER PUBLICATIONS

Corresponding U.S. Appl. No. 115/520,497, filed Apr. 20, 2017 (not published yet).

(Continued)

*Primary Examiner* — Mariam Qureshi
(74) *Attorney, Agent, or Firm* — The Roy Gross Law Firm, LLC; Roy Gross

(57) ABSTRACT

A polymer dispersed liquid crystal (PDLC) film, comprising: at least one first transparent flexible film coated with conductive material; at least one liquid crystal dispersion, allocated between said at least one first transparent flexible film and at least one second transparent flexible film; at least one second transparent flexible film coated with conductive material; where the PDLC comprises a pattern or a signage. Furthermore, the invention comprises a multichannel controller that enables independent control of each segment of the pattern.

18 Claims, 11 Drawing Sheets

(56) References Cited

U.S. PATENT DOCUMENTS

| | | | |
|---|---|---|---|
| 4,938,568 A * | 7/1990 | Margerum | C09K 19/544 |
| | | | 349/201 |
| 5,299,289 A * | 3/1994 | Omae | G02F 1/133371 |
| | | | 348/E9.027 |
| 5,459,594 A | 10/1995 | Nakanishi et al. | |
| 5,631,665 A | 5/1997 | Takizawa et al. | |
| 5,712,692 A | 1/1998 | Kanagawa et al. | |
| 5,843,333 A | 12/1998 | Hakemi | |
| 6,049,366 A | 4/2000 | Hakemi et al. | |
| 6,275,208 B1 | 8/2001 | Park | |
| 6,377,339 B1 * | 4/2002 | Westerman | G03G 15/605 |
| | | | 349/169 |
| 6,722,142 B1 | 4/2004 | Pagel | |
| 6,741,239 B2 | 5/2004 | Iwasaki | |
| 6,819,367 B1 | 11/2004 | Cava | |
| 6,982,178 B2 | 1/2006 | LeCain et al. | |
| 7,091,351 B2 | 8/2006 | Dong et al. | |
| 7,238,397 B2 | 7/2007 | Iftime et al. | |
| 8,107,050 B2 | 1/2012 | Hsieh et al. | |
| 8,792,069 B2 | 7/2014 | Hyytiainen | |
| 2004/0222814 A1 | 11/2004 | Kim et al. | |
| 2005/0001954 A1 | 1/2005 | Stephenson et al. | |
| 2006/0046017 A1 | 3/2006 | Adickes | |
| 2006/0062898 A1 * | 3/2006 | Rankin | G02F 1/133305 |
| | | | 427/58 |
| 2006/0122532 A1 | 6/2006 | Lee | |
| 2006/0250534 A1 | 11/2006 | Kutscher et al. | |
| 2007/0152928 A1 * | 7/2007 | Doane | G02F 1/133305 |
| | | | 345/87 |
| 2008/0218752 A1 | 9/2008 | Hagler | |
| 2008/0263963 A1 | 10/2008 | Lee et al. | |
| 2009/0151606 A1 | 6/2009 | Korber et al. | |
| 2009/0273737 A1 | 11/2009 | Zhao et al. | |
| 2010/0025641 A1 | 2/2010 | Jimbo et al. | |
| 2010/0245321 A1 | 9/2010 | Ogita et al. | |
| 2012/0068951 A1 | 3/2012 | Venkatasubramanian | |
| 2012/0105424 A1 | 5/2012 | Lee et al. | |
| 2012/0169987 A1 * | 7/2012 | Li | G02F 1/1334 |
| | | | 349/183 |
| 2012/0256895 A1 | 10/2012 | Azumada et al. | |
| 2012/0270649 A1 * | 10/2012 | Griswold | G02B 27/2278 |
| | | | 463/31 |
| 2012/0307337 A1 | 12/2012 | Bartug et al. | |
| 2013/0053468 A1 | 2/2013 | Lee et al. | |
| 2013/0070326 A1 * | 3/2013 | Frisken | H04L 27/18 |
| | | | 359/279 |
| 2013/0188105 A1 | 7/2013 | Dobrenko et al. | |
| 2013/0272833 A1 | 10/2013 | Duncan et al. | |
| 2013/0321744 A1 | 12/2013 | Lin et al. | |
| 2013/0342773 A1 | 12/2013 | Chu et al. | |
| 2014/0132909 A1 | 5/2014 | Wardhana et al. | |
| 2014/0313105 A1 | 10/2014 | Peso et al. | |
| 2015/0055055 A1 * | 2/2015 | Ebisui | G02F 1/133606 |
| | | | 349/61 |
| 2015/0070628 A1 * | 3/2015 | Suzuki | G02F 1/133617 |
| | | | 349/69 |
| 2015/0338715 A1 | 11/2015 | Schaefer et al. | |
| 2017/0075152 A1 | 3/2017 | Lofer et al. | |

FOREIGN PATENT DOCUMENTS

| | | |
|---|---|---|
| FR | 2749450 A1 | 12/1997 |
| JP | 6068704 A | 11/1994 |
| KR | 100528995 B1 | 11/2005 |
| KR | 20120045543 A | 5/2012 |
| KR | 20140023796 A | 2/2014 |
| WO | 2006/014041 A1 | 2/2006 |
| WO | 2007054944 a1 | 5/2007 |
| WO | 2011080958 A1 | 7/2011 |
| WO | 2012/042518 A1 | 4/2012 |
| WO | 2015/170318 A2 | 11/2015 |
| WO | 2016/063273 A1 | 4/2016 |
| WO | 2016/063277 A2 | 4/2016 |
| WO | 2016/071908 A1 | 5/2016 |

OTHER PUBLICATIONS

Corresponding U.S. Appl. No. 15/524,297, filed May 4, 2017 (not published yet).
Non-Final Rejection Office Action issued for U.S. Appl. No. 14/255,260, dated Jul. 11, 2016.
Non-Final Rejection Office Action issued for U.S. Appl. No. 14/255,260, dated Jan. 4, 2016.
Restriction/Election Requirement Office Action issued for U.S. Appl. No. 14/255,260, dated Sep. 30, 2015.
Department of Defense, Military Specification—"Filter, Polarizing (for optical instruments)", MIL-F-21424A(OS), Jul. 31, 1975, pp. 3-7.
Wikipedia, "Dimmer", https://en.wikipedia.org/wiki/Dimmer, last edited Mar. 11, 2017.
International Preliminary Report on Patentability (Chapter I) for PCT/IL2011/000761, dated Apr. 2, 2013.
International Preliminary Report on Patentability (Chapter I) for PCT/IL2015/050543, dated Apr. 25, 2017.
International Preliminary Report on Patentability (Chapter I) for PCT/IL2015/051031, dated Apr. 25, 2017.
International Preliminary Report on Patentability (Chapter I) for PCT/IL2015/050461, dated Nov. 8, 2016.
International Preliminary Report on Patentability (Chapter II) for PCT/IL2015/051069, dated Nov. 25, 2016.
International Search Report for PCT/IL2011/000761, dated Jan. 19, 2012.
International Search Report for PCT/IL2015/051069, dated Apr. 7, 2016.
International Search Report for PCT/IL2015/051031, dated Jul. 1, 2016.
International Search Report for PCT/IL2015/05046, dated Nov. 2, 2015.
International Search Report for PCT/IL2015/050543, dated Dec. 18, 2015.
Okatani T. et al., "Study of image quality of superimposed projection using multiple projectors", IEEE Trans Image Process, vol. 18(2), Feb. 2009.
Response to Non-Final Rejection Office Action issued for U.S. Appl. No. 14/255,260, dated Jan. 4, 2016, dated Mar. 31, 2016.
Response to Restriction/Election Requirement Office Action issued for U.S. Appl. No. 14/255,260, dated Sep. 30, 2015, dated Nov. 29, 2015.
Written Opinion of International Search Authority for PCT/IL2011/000761, dated Jan. 19, 2012.
Written Opinion of International Search Authority for PCT/IL2015/051069, dated Apr. 7, 2016.
Written Opinion of International Search Authority for PCT/IL2015/051031, dated Jul. 1, 2016.
Written Opinion of International Search Authority for PCT/IL2015/050461, dated Nov. 2, 2015.
Written Opinion of International Search Authority for PCT/IL2015/050543, dated Dec. 18, 2015.
Glass Apps acquires Citala smart film manufacturing assets; Jan. 21, 2014 https://www.glassonline.com/glass-apps-acquires-citala-smart-film-manufacturing-assets/.
Citala's innovative flexible display technology, Dec. 16, 2008 by Dr Susann Reuter, http://www.printedelectronicsworld.com/articles/1175/citalas-innovative-flexible-display-technology.
https://web.archive.org/web/20140702194748mp_/http://www.glass-apps.com/aboutus/.
Laminated Electro-Active Foils liquid crystal transflective panels; Daping Chu Department of Engineering University of Cambridge, Cambridge, Mar. 15, 2011.

* cited by examiner

DYNAMIC SIGNAGE, GLAZED AND PATTERNED PDLC DEVICES AND METHODS FOR CREATING THEREOF

CROSS-REFERENCE TO RELATED APPLICATIONS

This application is a U.S. National Phase filing under 35 U.S.C. 371 of International (PCT) Patent Application No. PCT/IL2015/051031, filed 19 Oct. 2015, which claims priority from U.S. Patent Application No. 62/065,811, filed 20 Oct. 2014, both of which are incorporated by reference in their entirety.

FIELD OF THE INVENTION

The present invention relates to any liquid crystal device and, more specifically, to a photolithographic and conductive film pattern methods for creating signage & patterns on a polymer dispersed liquid crystal film.

BACKGROUND OF THE INVENTION

U.S. Pat. No. 4,938,568 discloses a method of forming a polymer dispersed liquid crystal (PDLC) film which consists of forming a solution of LC dissolved in a monomer, photo-polymerizing the solution to form a film having a dispersion of LC inclusions therein, establishing a correlation between the LC inclusion size and selected characteristics of the film, selecting a LC inclusion size corresponding to desired film characteristics, and controlling the conditions of photopolymerization to achieve said LC inclusion size.

Suitable cure for the polymeric dispersed liquid crystal composites, where a photomask patterning technique is used, may be obtained by either Utlraviolet (UV) or Electron-Beam (EB) radiation mechanisms, where in the case of UV curing mechanism, a conventional UV photoinitiator is incorporated into the polymer components, and the composite is subjected to UV radiation. Cure or polymerization is achieved by directing a light of appropriate wavelength and intensity toward the solution. Ultraviolet light is typically used. A mercury lamp which emits light in the 300 to 500 nanometer wavelength range, with the greatest intensity at about 365 nanometers, is preferred. In the case of EB curing mechanism, no photoinitiator is necessary and curing operates at lower temperatures.

This method of curation enables a wide variety of applications of PDLC devices. In case of PDLC patterns created by etching techniques any method of curation can be used.

SUMMARY OF THE INVENTION

A polymer dispersed liquid crystal (PDLC) film, comprising: at least one first transparent flexible film coated with conductive material; at least one liquid crystal dispersion, allocated between at least one first transparent flexible film and at least one second transparent flexible film; at least one second transparent flexible film coated with conductive material; wherein the PDLC comprises a pattern or a signage. Furthermore, the invention comprises a multichannel controller that enables independent control of each segment of the pattern, The PDLC comprises a step of photo polymerization accomplished by ultraviolet or electron beam light exposure. The conditions of the photo polymerization are spatially varied by spatially varying the exposure intensity over the film. In one preferred embodiment of the invention the exposure intensity is spatially varied by exposing the film through a mask having a spatial variation in transmissivity. The mask is at least partially transmissive or has a spatial variation in transmissivity, thereby enabling substantially the entire film to polymerize at generally the same time but at spatially varying polymerization rates corresponding to the spatial variation in mask transmissivity. The solution is polymerized in a two-step polymerization process comprising an exposure through the mask at one exposure intensity in one step, and an exposure without the mask at a different exposure intensity in another step. In another preferred embodiment of the invention the transparent flexible film's conductive coating is characterized by discontinuity of the coating by means of etching by mechanical pressure. In another preferred embodiment of the invention the transparent flexible film's conductive coating is characterized by discontinuity of the coating by means of etching by laser beam. In these cases any method of curation can be used. The PDLC is characterized by a morphology in polymer matrix of nano-droplets, micro-droplets, macro-droplets or polymer network. The PDLC could be made by phase separation methods. The PDLC could be made by micro-encapsulation methods. The PDLC is allocated between two flexible transparent conductive supports. In one preferred embodiment of the invention one flexible transparent conductive support contains a pattern or signage due to the discontinuity in the conductive coating. In another preferred embodiment the liquid crystal device comprises a pattern or signage due to the variation in the exposure intensity and the usage of a photomask. The PDLC is characterized by the possibility of containing dichroic organic and metal-organic dyes. The PDLC is characterized by the possibility of containing nematic mixtures for static solar-reflection mode. The PDLC is characterized by the possibility of containing broad-band cholesteric materials for dynamic solar-control mode. The PDLC is characterized by the possibility of containing metal-organic mesogens dispersed in the liquid crystal composition.

A polymer dispersed liquid crystal (PDLC) film, comprising: at least one first transparent flexible film coated with conductive material; a liquid crystal dispersion, allocated between the flexible transparent conductive film and at least one second transparent flexible film coated with conductive material; wherein the PDLC film is characterized by different optical properties in the liquid crystal dispersion by means of variation of UV or electron beam light exposure during the curing process of the same.

A polymer dispersed liquid crystal (PDLC) film, where any of the transparent flexible films can be coated with an anti-scratch hard coating. Furthermore, any of said transparent flexible films can be coated with a dry or wet adhesive to create a retrofit film. Therefore, said PDLC can be a stand-alone device or retrofitted into an already existing surface.

A method for producing polymer dispersed liquid crystal (PDLC) film, comprising the steps of: providing materials for producing a PDLC, comprising: a first transparent flexible film coated with conductive material; a liquid crystal dispersion; a second transparent flexible film coated with conductive material; allocating the liquid crystal dispersion between a transparent flexible films coated with conductive material; curing the PDLC film by means of UV or electron beam light; wherein the step of curing further comprising step of inducing different exposure rates of the UV or electron beam light to the PDLC film. The step of inducing different exposure rates of the UV to the PDLC film is provided by using of a photomask.

The method further comprises a step of coating any of said transparent flexible films with an anti-scratch hard coating. The method further comprises a step of coating any of said transparent flexible films with a dry or wet adhesive to create a retrofit film. The method further comprises a step of retrofitting said PDLC film into an already existing surface. The method further comprises a step of enabling the mask to move synchronously to the PDLC film movement during the curing process.

A curing method for producing polymer dispersed liquid crystal (PDLC) film, comprising steps of: providing materials for producing a PDLC, comprising: a first transparent flexible film coated with conductive material; a liquid crystal dispersion; a second transparent flexible film coated with conductive material; allocating the liquid crystal dispersion between the transparent flexible films coated with conductive material; introducing the PDLC film in the curing machine; thereby producing the PDLC; wherein the curing method comprising step of inducing different exposure rates of the UV to the PDLC film by means of a photomask.

A transparent flexible film coated with conductive material; wherein the transparent flexible film is characterized by a discontinuous coating of conductive material having a predetermined pattern. In one preferred embodiment of the invention the transparent flexible film's discontinuations are made by means of etching by mechanical pressure. In another preferred embodiment of the invention the transparent flexible film's discontinuations are made by means of etching by laser beam. In these cases any method of curation can be used.

A first method for producing discontinuations in the coating of a transparent flexible film coated with conductive material, the method comprising steps of: providing at least one transparent flexible film coated with conductive material; etching the conductive material by means of mechanical pressure according to a predefined scheme; wherein the step of etching by mechanical pressure creates a pattern.

A second method for producing discontinuations in the coating of a transparent flexible film coated with conductive material, the method comprising steps of: providing at least one transparent flexible film coated with conductive material; etching the conductive material by means laser beam according to a predefined scheme; wherein the step of etching by laser beam creates a pattern.

DETAILED DESCRIPTION OF THE INVENTION

Figure 1:
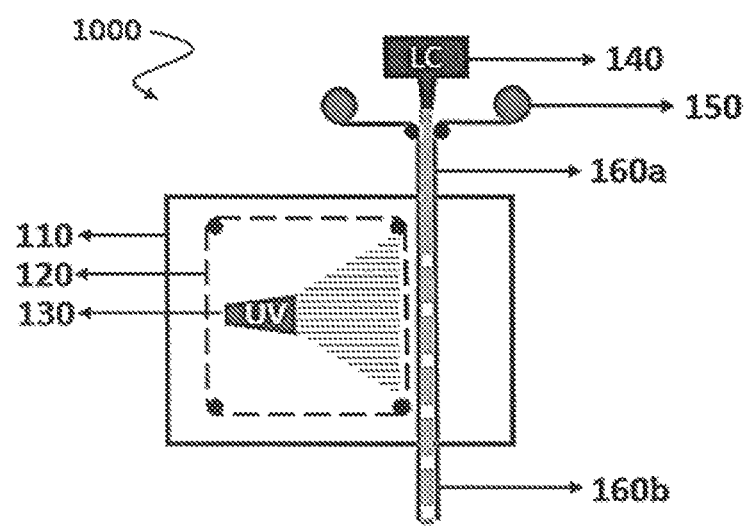
FIG. 1 and FIG. 2 is a simplified illustration showing the method for creating patterns in PDLC by means of a photomask during curation.
Figure 1:
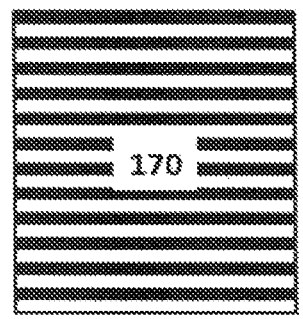

The following description is provided, so as to enable any person skilled in the art to make use of the invention and sets forth the best modes contemplated by the inventor of carrying out this invention. Various modifications, however, are adapted to remain apparent to those skilled in the art, since the generic principles of the present invention have been defined specifically to provide PDLC films with specific patterns and the methods thereof. Thus a novel method for creating such films has been obtained.

Retrofit(ting): refers hereinafter to the modification of a conventional window or surface by combining the same in some manner with an enhancement, i.e., a switchable glazing, non-switchable light modulating device, etc.

In order to understand the novelty in the method presented in this invention the general method for creating PDLC should be explained. In polymer dispersed liquid crystal devices (PDLCs), liquid crystals are dissolved or dispersed into a liquid polymer followed by solidification or curing of the polymer. There are several curing techniques. One example is radiation curing by either Ultraviolet (UV) or Electron-Beam (EB). During the change of the polymer from a liquid to solid, the liquid crystals become incompatible with the solid polymer and form droplets throughout the solid polymer. The curing conditions affect the size of the droplets that in turn affect the final operating properties of the PDLC. Typically, the liquid mix of polymer and liquid crystals is placed between two layers of glass or plastic that include a thin layer of a transparent, conductive material followed by curing of the polymer, thereby forming the basic sandwich structure of the PDLC. Electrodes connected to a power supply are attached to the transparent conductive material. With no applied voltage, the liquid crystals are randomly arranged in the droplets, resulting in scattering of light as it passes through the smart window assembly. This results in the translucent, appearance. When a voltage is applied to the electrodes, the electric field formed between the two transparent electrodes on the glass or film causes the liquid crystals to align, allowing light to pass through the droplets with very little scattering and resulting in a transparent state. The degree of transparency can be controlled by the applied voltage. This is possible because at lower voltages, only a few of the liquid crystals align completely in the electric field, so only a small portion of the light passes through while most of the light is scattered. As the voltage is increased, fewer liquid crystals remain out of alignment, resulting in less light being scattered. It is also possible to control the amount of light and heat passing through, when tints and special inner layers are used. It is also possible to create fire-rated and anti X-Ray versions for use in special applications. Most of the devices offered today operate in on or off states only, even though the technology to provide for variable levels of transparency is easily applied. This technology has been used in interior and exterior settings for privacy control (for example conference rooms, intensive-care areas, bathroom/shower doors) and as a temporary projection screen. It is commercially available in rolls as adhesive backed Smart film that can be applied to existing windows and trimmed to size in the field (http://en.wikipedia.org/wiki/Smart_glass#Polymer_dispersed_liquid_crystal_devices— included hereby as reference).

According to the present invention two different main types of patterned PDLC are presented: 1. The patterns are created by using a photomask. 2. The patterns are created using etching techniques. In the first type because of the photomask different morphologies are created inside the liquid crystal dispersion and when an electrical signal in applied different transparencies are obtained according to the pattern created by the photomask. In the second type according to the mechanical etching—each segment is isolated from the others and needs its own electrical signal because there is discontinuation of the conductive layer. In this case the invention comprises a multichannel controller that enables independent control of each segment of the pattern.

According to the present invention, different techniques may be applied to the PDLC in order to confer patterns and signs to the film.

A first technique comprises modification of the optical properties of the film by means of introducing a variable in the UV (or EB) exposure intensity during the curation of the polymer by means of a moving photomask. This variation allows the existence of different size of droplets within the same film. Reference is now made to FIG. 1. Schematic illustration of a roll-to-roll continuous manufacturing process for the preparation of liquid crystal film, comprising a device 1000 for manufacturing PDLC, where liquid crystal 140 dispersed in polymer is being poured into two layers of glass or plastic comprising very thin, transparent, conducting films (like ITO, silver or any other coating material) 150, then inserted into the curation machine 110, in which the uncured PDLC 160a is being exposed to ultraviolet rays (UV) or electron beam (EB) 130 in order to begin the polymerization process. The cured PDLC 160b exits the device with characteristics that are depended on the polymerization conditions over the film area. For a PDLC film polymerized by exposure to UV (or EB) radiation, the LC inclusion size has been found to increase with lower exposure intensities, and to decrease with greater exposure intensities. In turn, the film's threshold and operating voltages for optical transmission can be increased by reducing the inclusion size (increasing the exposure intensity) or decreased by increasing the inclusion size (reducing the exposure intensity); its contrast ratio and absolute transmission can be increased by decreasing the inclusion size (increasing the exposure intensity) or decreased by increasing the inclusion size (decreasing the exposure intensity); its optical response times can be increased by increasing the inclusion size (reducing the exposure intensity) or decreased by decreasing the inclusion size (increasing the exposure intensity). The temperature at which polymerization takes place and the LC concentration can also be selected to determine the film's electro-optic properties. In general, smaller LC inclusions are formed at higher temperatures and with lower LC molecule concentrations. Photomask 120 is designed to impose a spatial variation in the amount of UV radiation reaching the underlying solution 160b, with a corresponding spatial variation in its rate of polymerization. This in turn produces a spatial variation in the LC inclusion size within the finished PDLC film 160b, the distribution of LC inclusion sizes being controlled by the mask design and contrast 170. FIG. 1, illustrates one type of mask that can be used to produce a periodic spatial variation in LC inclusion size that yields a film with built-in diffraction gratings. The mask consists of transmissive areas separated by periodic bands of lesser or zero transmissivity. The mask may be implemented as a rotating designed mask 120, with bands formed by metal strips on the substrate. When the bands completely block the UV radiation, polymerization can be performed in a two-step process. In the first step, mask is held in place over the film structure, and the portions of solution which are not blocked by the mask are at least partially polymerized by exposure at a given UV intensity. This results in the formation of relatively small LC inclusions in the exposed regions. The mask is then removed and the film exposed again, but at a lesser UV intensity, resulting in the formation of relatively larger LC inclusions in the areas not previously polymerized. Alternately, the masked exposure could be performed at a lesser UV intensity than the unmasked exposure.

In another embodiment the mask moves synchronously to the PDLC film movement during the curing process. This is done by adding the specific components to the curing machine.

In one preferred embodiment of the invention, the variation in curation is enabled by means of a photomask that rotates concomitantly with the passage of the film through the UV curator compartment.

Figure 2:
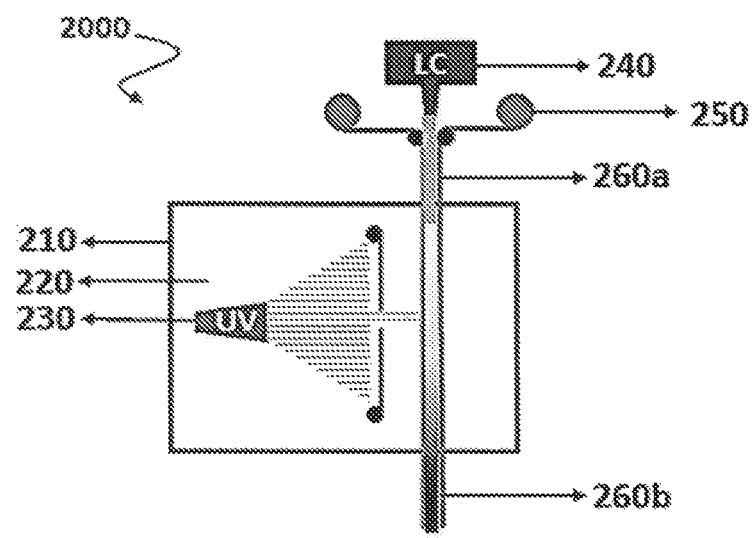
Figure 2:
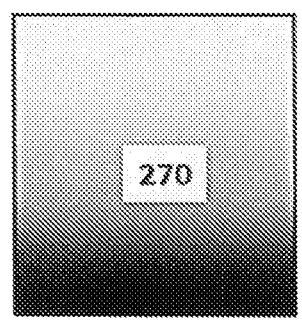

A second technique comprises modification of the optical properties of the film by means of introducing a variable in the UV (or EB) exposure time during the curation of the polymer by means of a fixed photomask. This variation allows the existence of different size of droplets within the same film. Reference is now made to FIG. 2. Schematic illustration of a roll-to-roll continuous manufacturing process for the preparation of liquid crystal film, comprising a device 2000 for manufacturing PDLC, where liquid crystal 240 dispersed in polymer is being poured into two layers of glass or plastic comprising very thin, transparent, conducting films (like ITO, silver or any other coating material) 250, then inserted into the curation machine 210, in which the uncured PDLC 260a is being exposed to ultraviolet rays (UV) or electron beam (EB) 230 in order to begin the polymerization process. The cured PDLC 260b exits the device with characteristics that are depended on the polymerization conditions over the film area. Photomask 220 is designed to impose a spatial focalized amount of UV (or EB) radiation reaching the underlying solution 260b, with a corresponding spatial variation in its rate of polymerization by means of the time exposure to each segment of the PDLC. This in turn produces a spatial variation in the LC inclusion size within the finished PDLC film 260b, the distribution of LC inclusion sizes being controlled by the time of exposure 270.

In another preferred embodiment of the invention, the variation in curation is enabled by means of changing the time of exposure in different segments of the PDLC. This can be achieved by increasing the speed of the passage of the film through the UV curing compartment, providing longer exposure at the beginning of the film and shorter exposure at the end of it. This technique requires to concentrate the UV exposure to the film to a small area. This is done using a special photomask that, instead of rotating concomitantly to the film, it doesn't rotates.

A third technique comprises cutting the conductive film material in order to create isolated zones of conduction within the PDLC. In this case any method of curation can be used.

Figure 3:
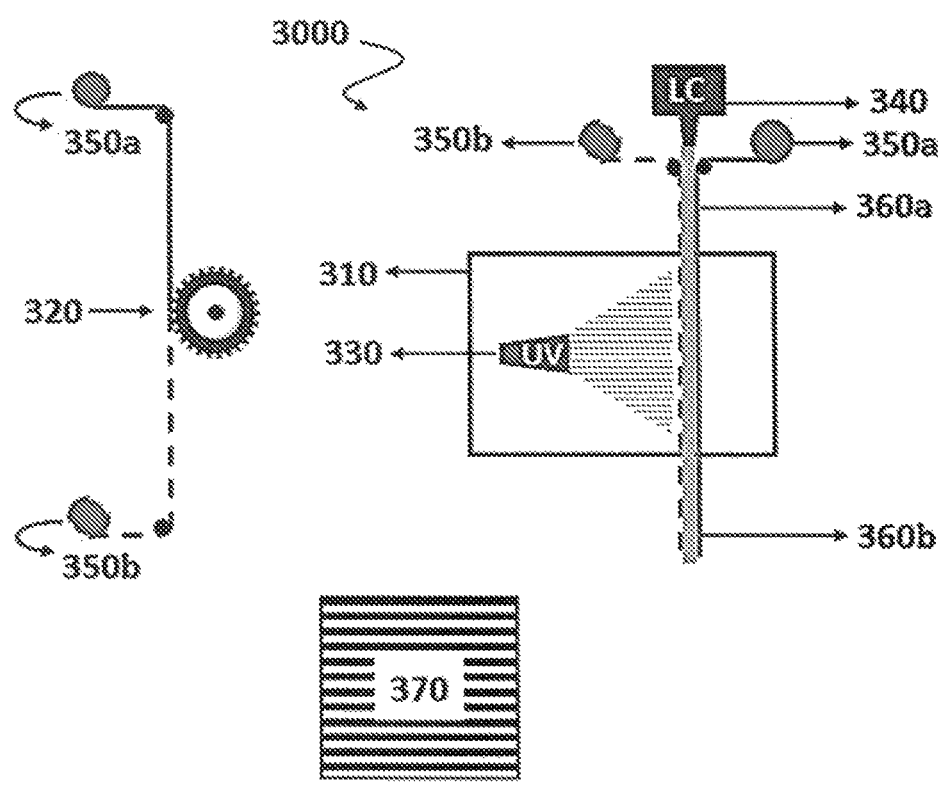
FIG. 3 is a simplified illustration showing the method for creating patterns in PDLC by means of a mechanical apparatus before the curation process.

Reference is now made to FIG. 3. Schematic illustration of a roll-to-roll continuous manufacturing process for the preparation of liquid crystal film, comprising a first step of mechanically 320 interrupting the continuous phase of the conductive film 350a in order to create a new conductive film comprising a pattern 350b; and a second step, comprising a device 3000 for manufacturing PDLC, where liquid crystal 340 dispersed in polymer is being poured into two layers of glass or plastic comprising very thin, transparent, one patterned and one not, conducting films (like ITO, silver or any other coating material) 350a-b, then inserted into the curation machine 310, in which the uncured PDLC 360a is being exposed to any kind of curation method, in this specific case ultraviolet rays (UV) 330 in order to begin the polymerization process. The cured PDLC 360b exits the device with characteristics that are depended on the etching patterns created over the conductive film area 370.

In a preferred embodiment of the invention, a pattern can be applied by mechanical pressure to the conductive film in order to create independent conduction zones, which can be activated in any possible order. From this point on mechanical pressure refers to any of the following: etching, engraving, cutting, carving and any action that can describe the removal of specific material from a specific area of the conductive film.

Figure 4:
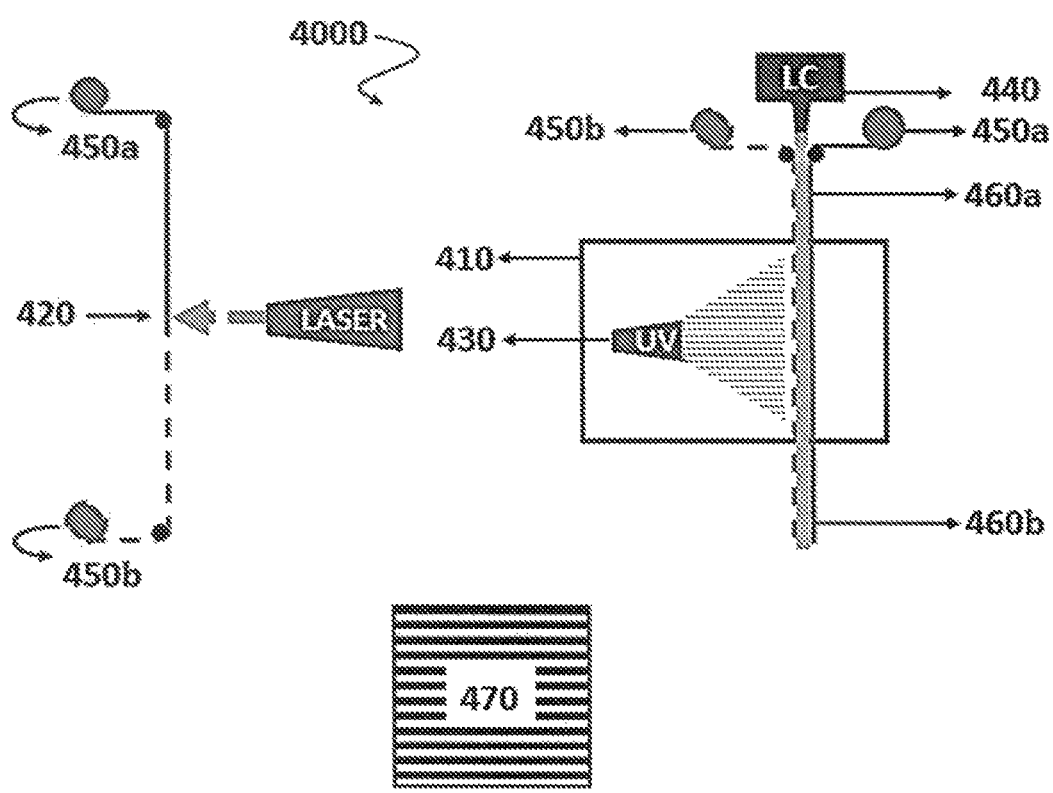
FIG. 4 is a simplified illustration showing the method for creating patterns in PDLC by means of a laser before the curation process.

Reference is now made to FIG. 4. Schematic illustration of a roll-to-roll continuous manufacturing process for the preparation of liquid crystal film, comprising a first step of interrupting, by means of a laser beam 420, the continuous phase of the conductive film 450a in order to create a new conductive film comprising a pattern 450b; and a second step, comprising a device 4000 for manufacturing PDLC, where liquid crystal 440 dispersed in polymer is being poured into two layers of glass or plastic comprising very thin, transparent, one patterned and one not, conducting films (like ITO, silver or any other coating material) 450a-b, then inserted into the curation machine 310, in which the uncured PDLC 460a is being exposed to any kind of curation method, in this specific case ultraviolet rays (UV) 430 in order to begin the polymerization process. The cured PDLC 460b exits the device with characteristics that are depended on the etching patterns created over the conductive film area 470.

In another preferred embodiment of the invention, a laser is applied to the conductive film in order to create independent conduction zones, which can be activated in any possible order.

In the technique using the etching techniques, the different segments in the patterned PDLC can be activated and deactivated individually and in any possible order and timing due to The Multichannel Controller (Gauzy Multichannel LC Controller). In the technique using the photomask, there is no need for the multichannel controller since all the film is in one piece and the difference is in the morphology. Therefore in this approach by changing the voltage to the entire film different parts of the film will work at different voltage levels.

For example: at 0V all film is opaque; at 15V a certain pattern turns transparent; at 45V another pattern turns transparent and at 70V all the film turns transparent.

In order to control the different parts, Gauzy's dimmer technology (US 20130188105 A1—incorporated herein as reference) will be used to power this type of film.

Figure 5:
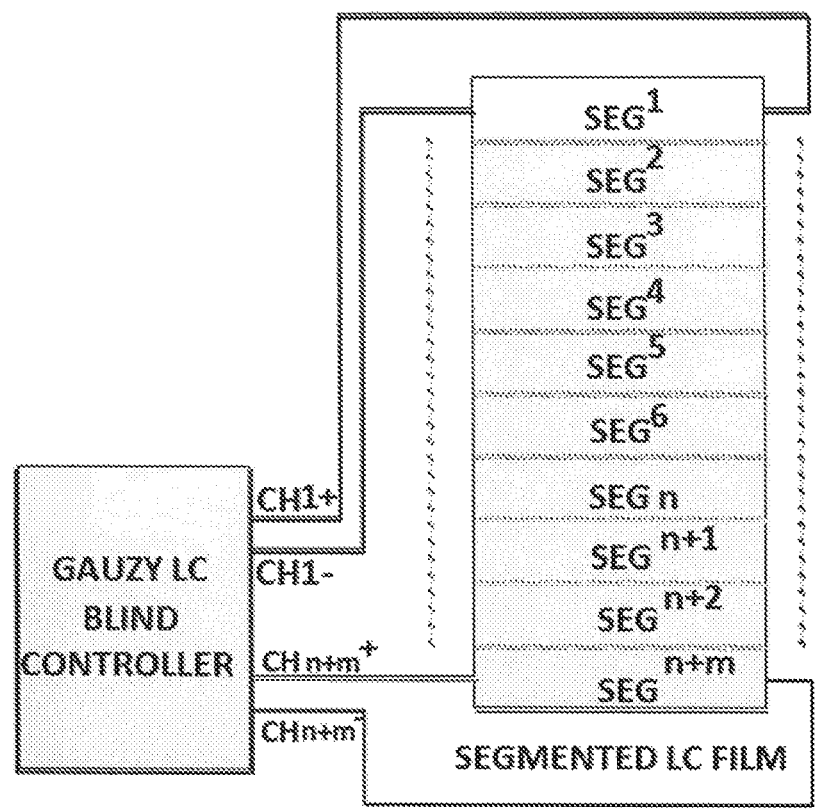
FIG. 5 is a schematic illustration of the multichannel controller connected to the segmented PDLC film.

Reference is now made to FIG. 5. Schematic illustration of the multichannel controller connected to the segmented PDLC. It is shown that the multichannel controller is connected independently to each segment of the PDLC in order to control each segment independently of the others.

Figure 6:
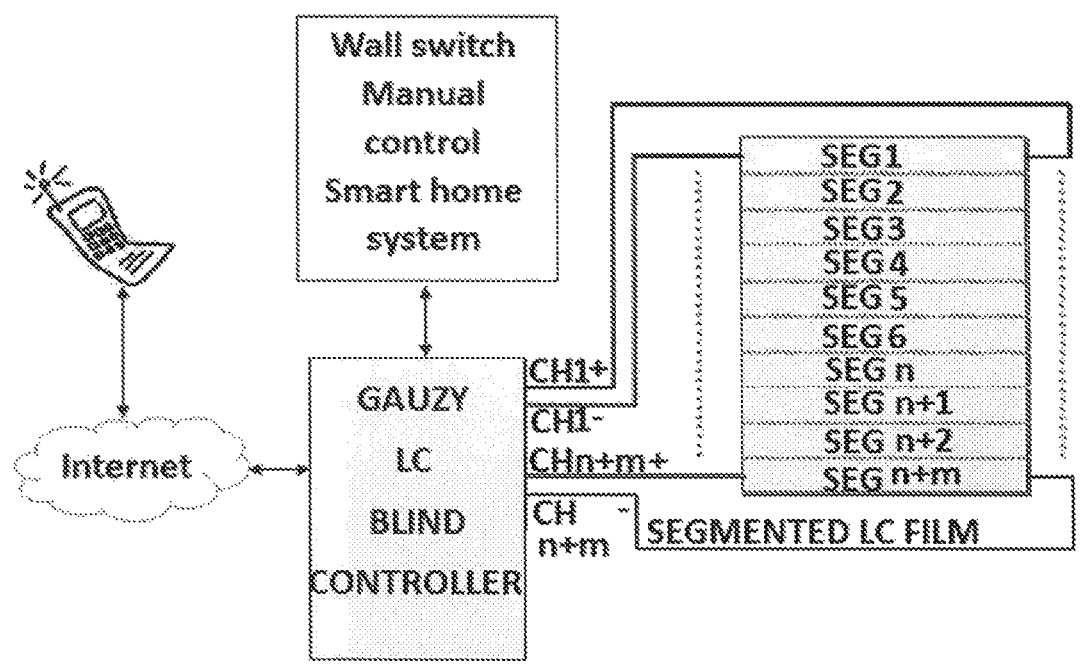
FIG. 6 is a schematic illustration of the multichannel controller connected to the segmented PDLC film and further connected to the human controlling interfaces.

Reference is now made to FIG. 6. Schematic illustration of the multichannel controller connected to the segmented PDLC and further connected to the human controlling interfaces, like a wall switch manual control, a smart home automatic systems or a smartphone/tablet.

Figure 7:
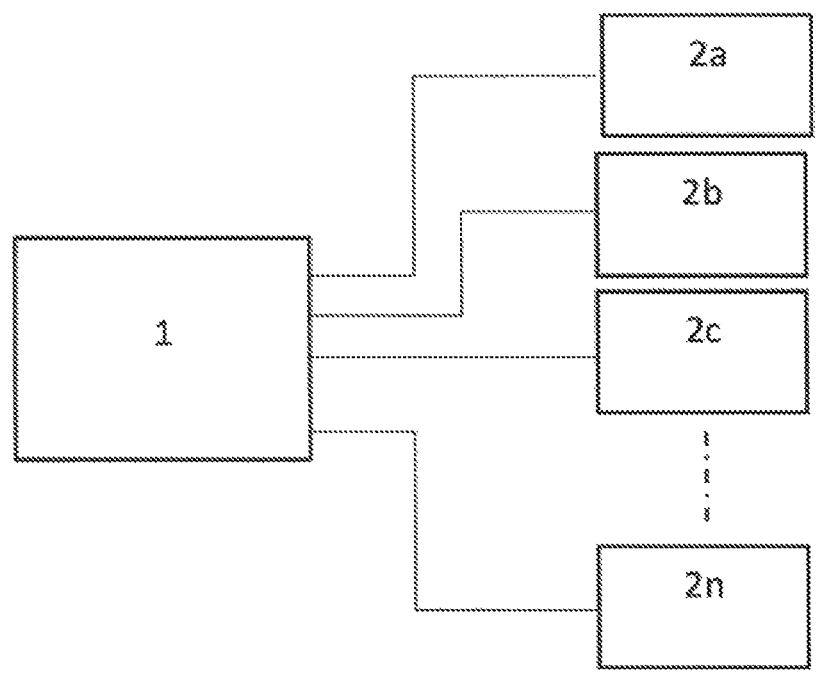
FIG. 7 is a schematic block diagram illustration of the multichannel controller composed by the system manager unit and the segment control unit

Reference is now made to FIG. 7. Schematic block diagram illustration of the multichannel controller, which is composed of two units: a System Manager Unit and a Segment Control Unit. System Manager Unit (1) is responsible to handle human interface commands, perform all timing operations and send commands to Segment Control Units (2) to turn ON of OFF the individual segments. The System Manager Unit controls the order of the operation of the segments, the time between each segment is being operated, and also includes the user interface circuitry, and the network connection (Ethernet block). Segments Control Units (2, 2a-2n) are segment controls, one per segment in the blind or pattern, which are responsible to directly operate the segment. Includes protection, dimming control for the segment, ability to change the speed of changing from opaque to transparent.

Figure 8:
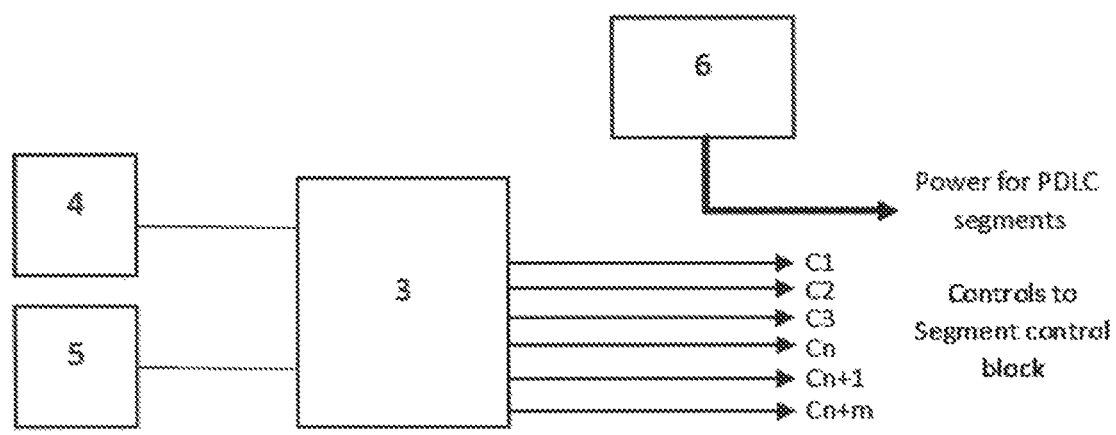
FIG. 8 is a schematic block diagram illustration of the system manager unit.

Reference is now made to FIG. 8. Schematic block diagram illustration of the System Manager Unit. A Control Unit (3), composed by but not limited to a microcontroller device, is responsible to calculate and perform all the timing to operate the pattern segments. The microcontroller (3) outputs a signal for each segment to initiate the transition from opaque to transparent or from transparent to opaque. This device (3) is the general management unit of the system. User interface (4) is composed from circuitry to accept and interpret commands from external user interface actions like wall switches, smart home relays, automatic control systems, etc. Ethernet block (5) is used to connect the System Manager Unit to the internet and connect the system to remote management and receive operation commands remotely. Signal generator (6) generates the square wave signal according to gauzy technology (US 20130188105 A1) in order to drive the PDLC segments (C1, C2 . . . Cn, Cn+1, Cn+m).

Figure 9:
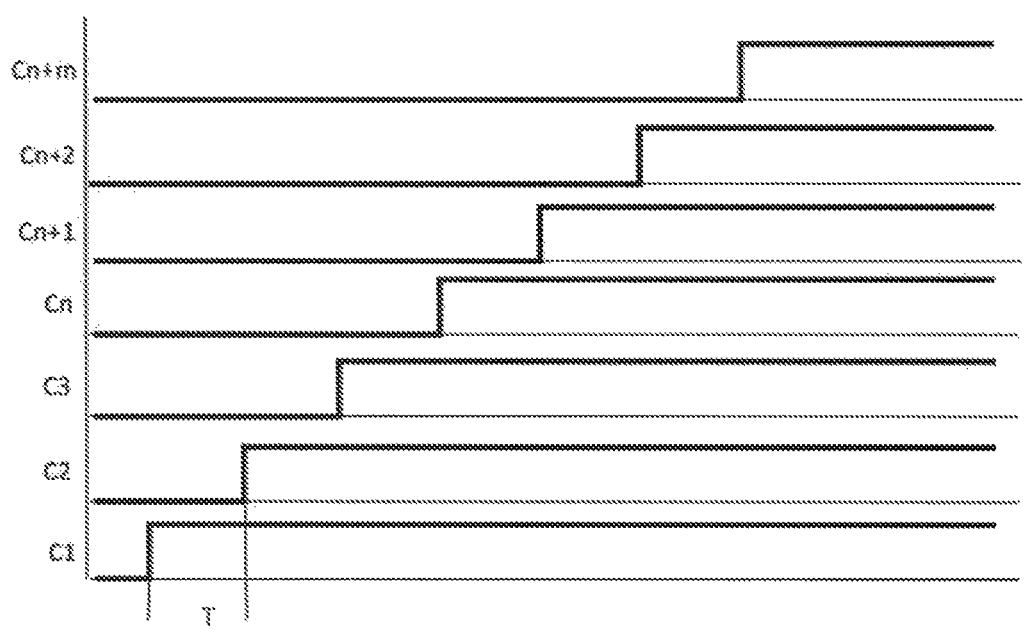
FIG. 9 is a schematic diagram of an example of the timing signals from the Control Unit (3) located in the System Manager Unit (1) towards each segment in order to operate the blind in a selected sequence.

Reference is now made to FIG. 9. Schematic diagram of an example of the timing signals from the Control Unit (3) located in the System Manager Unit (1) towards each segment in order to operate the pattern in a selected sequence. In this case it is shown a sequence suitable to create a blind. Where T—is the delay or time between operations of each segment. T is adjustable in the Control Unit (3).

Figure 10:
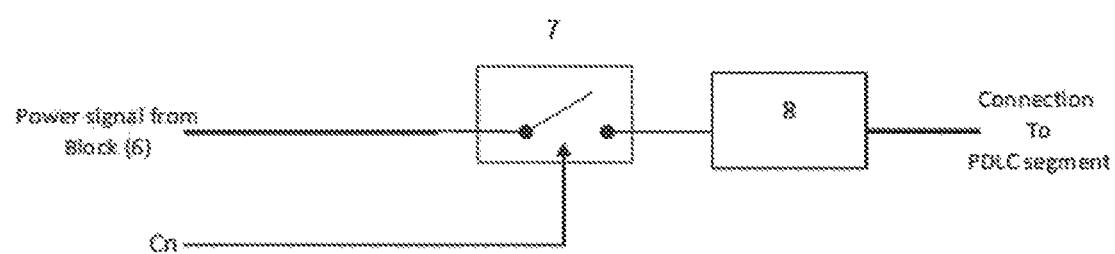
FIG. 10 is a schematic block diagram illustration of the segment controller unit (2).

Reference is now made to FIG. 10. Schematic block diagram illustration of the segment control unit (2). Controlled switch (7) to provide the electrical signal to the PDLC segment. It can be a mechanical relay controlled from signal Cn or a complex transistor array with soft start mechanism to enable dimming actuation (select the speed at which the PDLC changes from opaque to transparent and vice versa). Protection circuitry (8) is a short circuit protection, over voltage protection, overload protection.

Example

In a preferred embodiment of the invention the patterns are in rectangular shapes, in a way that they have a blind-like formation on the PDLC device. In one state the window is completely transparent, while in other states parts of the rectangular patterns are being activated. This activation is time and velocity dependent accordingly with the instructions received in the Manager System Unit.

Figure 11:
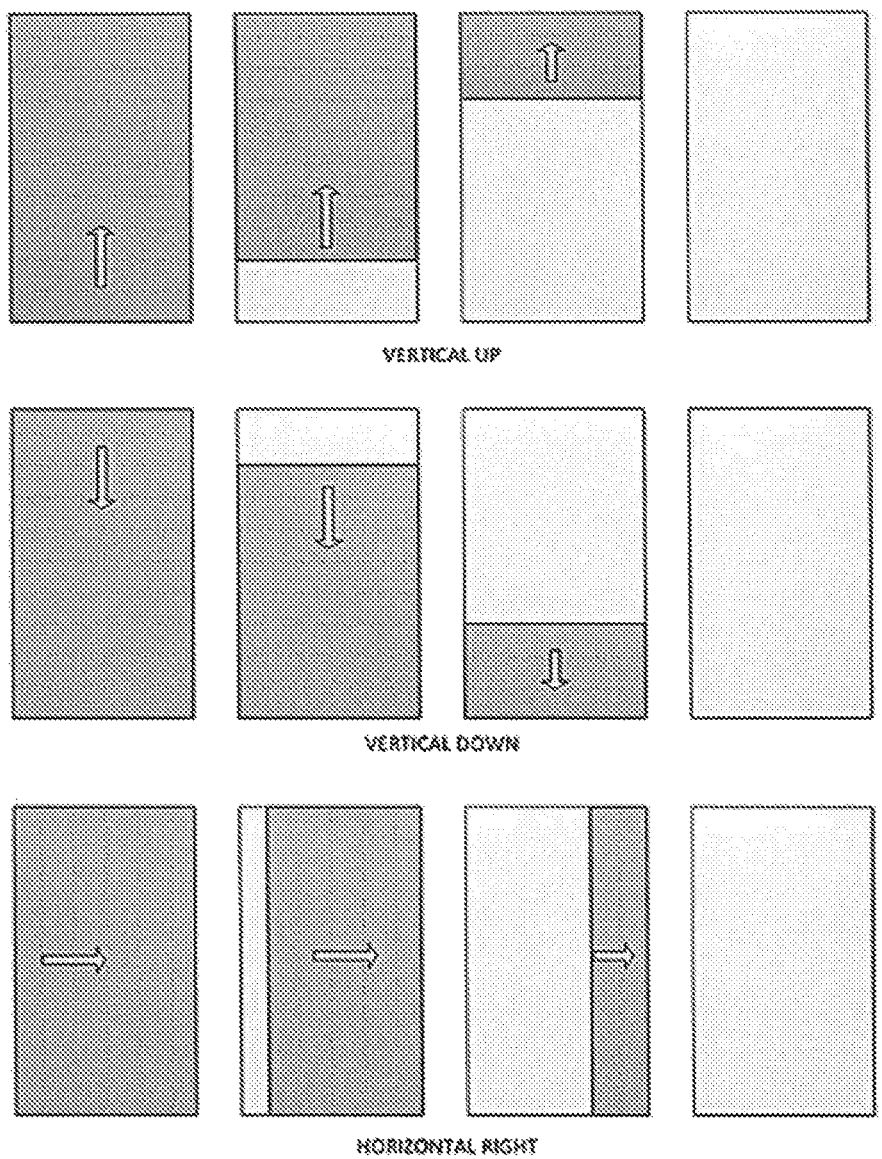
FIG. 11 is a schematic illustration of an example of the directionality of which the blinds can be operated.

Reference is now made to FIG. 11. Schematic illustration of an example of the directionality of which the blinds can be operated.

In a preferred embodiment the PDLC device with the signage and/or pattern can be enclosed between two glasses or may be retrofitted on existing interior and exterior architectural glazing, automotive windows, and other interior glazing. A transparent wet or dry adhesive can be used to stick the panel to the window, which may be integral with the panel or separately provided. The panel may also be applied to original windows before installation.

In another preferred embodiment any of the transparent flexible films can be coated with an anti-scratch hard coating. Furthermore, any of said transparent flexible films can be coated with a dry or wet adhesive to create a retrofit film. Therefore, said PDLC can be a stand-alone device or retrofitted into an already existing surface.

This invention can be used in a wide variety of applications including, but not limited to: advertising, store windows, blinds, decorative glass, home appliances like refrigerators, and architectural privacy windows.

What is claimed is:

1. A polymer dispersed liquid crystal (PDLC) film, comprising: a. at least one first transparent flexible film coated with conductive material, characterized by a discontinuous coating of conductive material having a plurality of predetermined patterns forming a plurality of independent sections; b. at least one liquid crystal dispersion, allocated between said at least one first transparent flexible film and at least one second transparent flexible film; c. at least one second transparent flexible film coated with conductive material; and d. a Multichannel Controller characterized by: i. at least one system manager unit; ii. at least one segment control unit, interconnected to said system controller on one side and interconnected to the segment of said PDLC; and iii. at least one microcontroller unit, at least one user interface, at least one Ethernet block and at least one signal generator; said microcontroller is adapted to calculate and perform the timing to operate said segments; wherein said PDLC film is characterized by different optical properties in said liquid crystal dispersion by means of variation of ultraviolet rays (UV) or electron beam (EB) light exposure during the curing process of the same further wherein said sections are configured to be independently connected to a power source or a control unit, wherein said second transparent flexible film coated with conductive material is characterized as being continuous; and wherein said microcontroller enables independent control of each segment of said discontinuous coating, further wherein said microcontroller is interconnected with a plurality of discontinuous patterns on said first transparent flexible film and a continuous pattern on said second transparent flexible film.

2. The PDLC film of claim 1, wherein said conductive film coating is characterized by discontinuity of the coating by means selected from the group consisting of:
   a. etching by mechanical pressure; and
   b. etching by laser beam.

3. The PDLC film of claim 1, wherein said PDLC is made by a method selected from the group consisting of:
   a. phase separation; and
   b. micro-encapsulation.

4. The PDLC film of claim 1, wherein said PDLC is characterized by containing at least one component, selected from a group consisting of dichroic organic and metal-organic dyes, nematic mixtures, broad-band cholesteric materials and metal-organic mesogens.

5. The PDLC film of claim 1, wherein any of said transparent flexible films additionally comprising at least one coating, said coating selected from a group consisting of an anti-scratch hard coating, a wet adhesive and a dry adhesive.

6. The PDLC film of claim 1, wherein said PDLC is a standalone device or retrofitted into an already existing surface.

7. The PDLC film of claim 1, wherein said PDLC is characterized by a morphology in polymer matrix of nano-droplets, micro-droplets, macro-droplets or polymer network.

8. A method for producing polymer dispersed liquid crystal (PDLC) film, comprising the steps of: a. providing materials for producing a PDLC, comprising: i. a first transparent flexible film coated with conductive material; ii. a liquid crystal dispersion; iii. a second transparent flexible film coated with conductive material; b. allocating said liquid crystal dispersion between a transparent flexible films coated with conductive material; c. curing said PDLC film by means of UV or electron beam light; and d. providing a Multichannel Controller characterized by: i. at least one system manager unit; ii. at least one segment control unit, interconnected to said system controller on one side and interconnected to the segment of said PDLC; and, iii. at least one microcontroller unit, at least one user interface, at least one Ethernet block and at least one signal generator; said microcontroller is adapted to calculate and perform the timing to operate said segments; wherein said step of curing further comprises a step of inducing different exposure rates of said UV or electron beam light to said PDLC film; further wherein said step of providing a first transparent film coated with conductive material further comprises a step of inducing discontinuity of the coating by means of etching by mechanical pressure or by laser beam, forming a plurality of independent sections and said step of providing a second layer comprises a step of constructing continuity of the coating; and wherein said microcontroller enables independent control of each segment of said discontinuous coating, further wherein said microcontroller is interconnected with a plurality of patterns on said first transparent flexible film and a continuous pattern on said second transparent flexible film.

9. The method of claim 8, wherein said step of inducing different exposure rates of said UV to said PDLC film is provided by using a photomask.

10. The method of claim 8, wherein the conditions of said different exposure rates are spatially varied by spatially varying the exposure intensity over the film.

11. The method of claim 10, wherein said exposure intensity is spatially varied by exposing the film through a mask having a spatial variation in transmissivity.

12. The method of claim 10, wherein said mask is at least partially transmissive, thereby enabling substantially the entire film to polymerize at generally the same time but at spatially varying polymerization rates corresponding to the spatial variation in mask transmissivity.

13. The method of claim 8, wherein the step of curing further comprises two-step polymerization process comprising a first step of exposing through said mask at one exposure intensity, and a second step of exposing without the mask at a different exposure intensity.

14. The method of claim 8, wherein said PDLC is characterized by at least one selected from the group consisting of:

a. a morphology in polymer matrix of nano-droplets, micro-droplets, macro-droplets or polymer network;
b. being manufactured by phase separation methods;
c. being manufactured by micro-encapsulation methods.

15. The method of claim 8, wherein said step of providing liquid crystal dispersion further comprises a step of introducing a material into said liquid crystal dispersion, said material selected from the group consisting of dichroic organic and metal-organic dyes, nematic mixtures, broadband cholesteric materials and metal-organic mesogens.

16. The method of claim 8, further comprising a step of coating any of said transparent flexible films, said coating selected from a group consisting of an anti-scratch hard coating, a wet adhesive and a dry adhesive.

17. The method of claim 8, further comprising the step a retrofitting said PDLC film into an already existing surface.

18. The method of claim 8, further comprising a step of enabling the mask to move synchronously to the PDLC film movement during the curing process.

* * * * *